United States Patent
Barsness et al.

(10) Patent No.: US 9,922,091 B2
(45) Date of Patent: *Mar. 20, 2018

(54) INTERMEDIATE WINDOW RESULTS IN A STREAMING ENVIRONMENT

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

This patent is subject to a terminal disclaimer.

(21) Appl. No.: 14/734,591

(22) Filed: Jun. 9, 2015

(65) Prior Publication Data

US 2016/0306857 A1    Oct. 20, 2016

Related U.S. Application Data

(63) Continuation of application No. 14/685,633, filed on Apr. 14, 2015, now Pat. No. 9,734,206.

(51) Int. Cl.
*G06F 17/00* (2006.01)
*G06F 17/30* (2006.01)

(52) U.S. Cl.
CPC .. *G06F 17/30516* (2013.01); *G06F 17/30336* (2013.01); *G06F 17/30377* (2013.01); *G06F 17/30442* (2013.01); *G06F 17/30563* (2013.01); *G06F 17/30592* (2013.01); *G06F 17/30958* (2013.01)

(58) Field of Classification Search
CPC ......... G06F 17/30516; G06F 17/30336; G06F 17/30377; G06F 17/30563; G06F 17/30592; G06F 17/30958; G06F 17/30442
USPC ....................................... 707/694
See application file for complete search history.

(56) References Cited

U.S. PATENT DOCUMENTS

| | | |
|---|---|---|
| 7,613,848 B2 | 11/2009 | Amini et al. |
| 7,644,110 B2 | 1/2010 | Nishizawa et al. |
| 7,739,331 B2 | 6/2010 | Gu et al. |

(Continued)

OTHER PUBLICATIONS

Turaga, Deepak, et al., "Design principles for developing stream processing applications", Software—Practice and Experience, vol. 40, © 2010 John Wiley & Sons, Ltd., pp. 1073-1104.*

(Continued)

*Primary Examiner* — Robert Stevens
(74) *Attorney, Agent, or Firm* — Robert J. Shatto

(57) ABSTRACT

A stream computing application may receive a stream of tuples to be processed by a plurality of stream operators. A first stream operator may receive a data stream, and the first stream operator may be configured to accumulate the data stream according to a window before performing one or more operations and transmitting tuples to a second stream operator. The second stream operator may request that the first stream operator send out tuples before the first stream operator's window has terminated. In response, the first stream operator may perform its operations on the tuples that it had accumulated before the request came in and then transmit a group of tuples with the intermediate results to the second stream operator.

15 Claims, 7 Drawing Sheets

(56) References Cited

U.S. PATENT DOCUMENTS

| | | | |
|---|---|---|---|
| 8,060,614 B2* | 11/2011 | Goldstein | G06F 9/5083 |
| | | | 709/226 |
| 8,095,690 B2 | 1/2012 | Kashiyama et al. | |
| 8,290,939 B2* | 10/2012 | Bouillet | G06F 17/30516 |
| | | | 707/722 |
| 8,560,526 B2 | 10/2013 | Santosuosso et al. | |
| 8,725,730 B2 | 5/2014 | Keeton et al. | |
| 8,788,481 B2 | 7/2014 | Imaki et al. | |
| 2009/0106214 A1 | 4/2009 | Jain et al. | |
| 2009/0106440 A1* | 4/2009 | Srinivasan | G06F 17/30516 |
| | | | 709/231 |
| 2009/0319687 A1 | 12/2009 | Goldstein et al. | |
| 2011/0016088 A1 | 1/2011 | Spackman | |
| 2012/0218268 A1 | 8/2012 | Accola et al. | |
| 2013/0254350 A1 | 9/2013 | Gedik et al. | |
| 2013/0275363 A1 | 10/2013 | Wu et al. | |
| 2013/0305225 A1* | 11/2013 | Branson | G06F 11/362 |
| | | | 717/128 |
| 2014/0089352 A1* | 3/2014 | Branson | G06F 17/30958 |
| | | | 707/798 |
| 2014/0095503 A1* | 4/2014 | Branson | G06F 17/30516 |
| | | | 707/737 |
| 2014/0280253 A1 | 9/2014 | Clark et al. | |
| 2016/0306855 A1 | 10/2016 | Barsness et al. | |

OTHER PUBLICATIONS

Gedik et al., "A model-based framework for building extensible, high performance stream processing middleware and programming language for IBM InfoSphere Streams," Software: Practice and Experience, vol. 42, Issue 11, Nov. 2012, pp. 1363-1391.

Li et al., "Window Queries Over Data Streams," PHD dissertation, Computer Science Dept., Portland State University, Portland, OR, PDXScholar, © 2008, 201 pgs.

Ballard et al., "IBM InfoSphere Streams Harnessing Data in Motion," Sep. 2010, 360 pages, IBM Redbooks http://www.redbooks.ibm.com/abstracts/sg247865.html.

IBM, "List of IBM Patents or Patent Applications Treated as Related.", Jun. 9, 2012, 2 pages.

* cited by examiner

| 612A | 612B | 612C | |
|---|---|---|---|
| 1 | 4 | 8 | 614A |
| 2 | 7 | 2 | 614B |
| 3 | 3 | 3 | 614C |
| 4 | 1 | 0 | 614D |
| 5 | 9 | 5 | 614E |
| 6 | 13 | 17 | 614F |
| 7 | 42 | 39 | 614G |
| 8 | 6 | 9 | 614H |
| 9 | 2 | 4 | 614I |
| 10 | 1 | 1 | 614J |

INTERMEDIATE WINDOW RESULTS IN A STREAMING ENVIRONMENT

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

Embodiments of the present disclosure include a method for sending intermediate results before the termination of a stream operator's window. A stream computing application may receive a stream of tuples to be processed by a plurality of stream operators. A first stream operator may receive a data stream, and the first stream operator may be configured to accumulate the data stream according to a window before performing one or more operations and transmitting tuples to a second stream operator. The second stream operator may request that the first stream operator send out tuples before the first stream operator's window has terminated. In response, the first stream operator may perform its operations on the tuples that it had accumulated before the request came in and then transmit a group of tuples with the intermediate results to the second stream operator. Additional embodiments of the present disclosure are directed to a system and a computer program product for sending intermediate results in a stream computing environment.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

Figure 1:
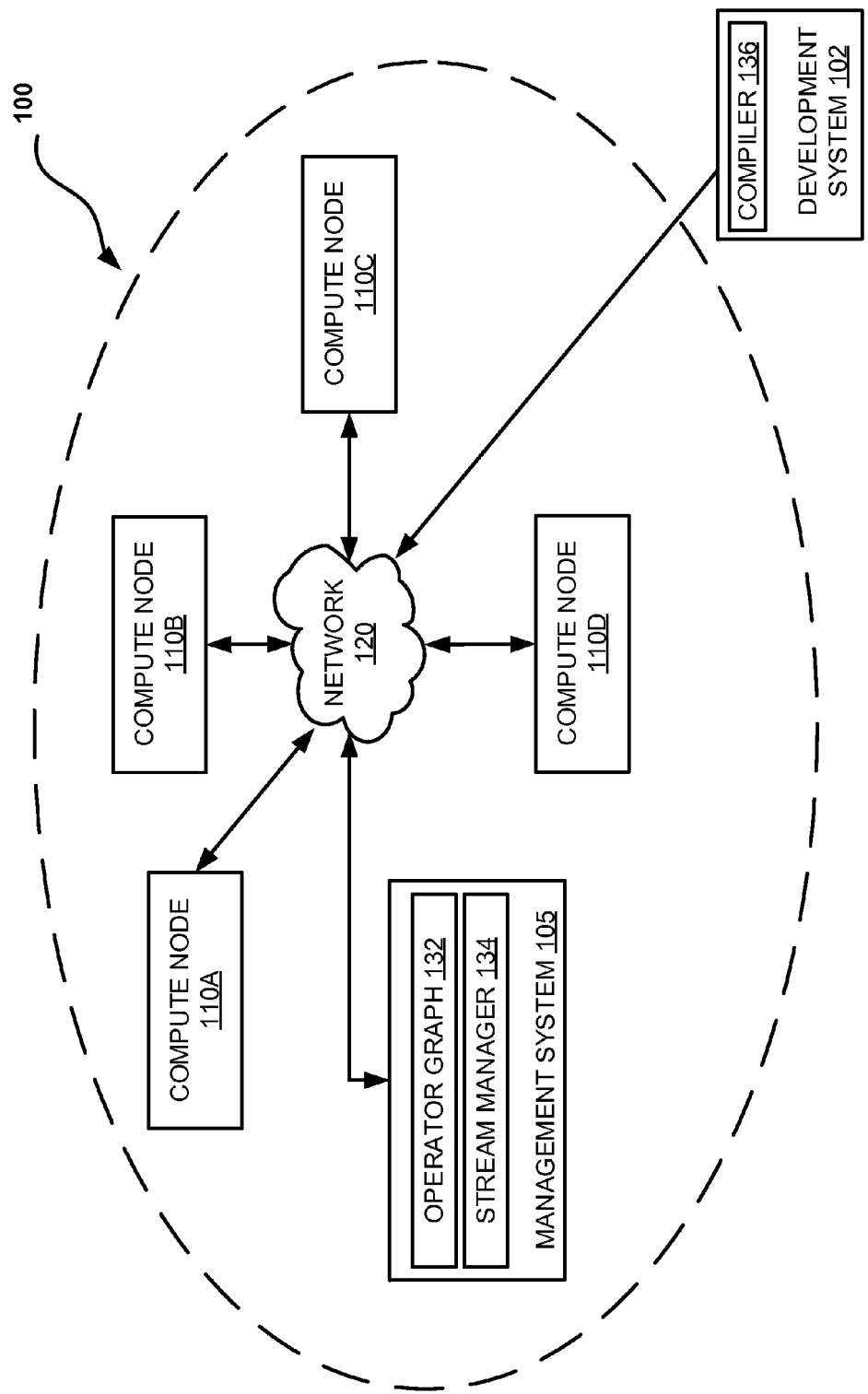
FIG. 1 illustrates a computing infrastructure configured to execute a stream computing application, according to various embodiments.

The present disclosure relates to stream computing, and in particular, to computing applications that receive streaming data and process the data as it is received. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it.

As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

A stream computing application may have several "jobs" (i.e., specific applications) executing in parallel. Each job may be associated with an individual data flow. These individual data flows may be thought of as separate operator graphs or portions of the same logical operator graph. In either case, a job or administrator may specify a particular stream of data (e.g., a connection between processing elements or operators in the operator graph) as "exportable." A different job may then dynamically connect to the exportable data stream (i.e., import the data stream). This is referred to as a "dynamic connection" because both jobs are currently executing when they begin to share the data stream.

A processing element or stream operator may perform an operation that employs a windowing condition. A "window," as referred to in this description and the claims, is a logical container for tuples received by an input port of a stream operator. Conceptually, a stream may be considered a pseudo-infinite sequence of tuples. A windowing condition may allow for the creation of subsets or groups of tuples within a stream, allowing a stream operator to perform an operation on a group of tuples instead of on a single tuple. As an example, an accumulate stream operator supports windowing by default. However, a stream operator may not necessarily support windowing by default. A stream operator may, however, be configured to support windowing.

A window may be a tumbling or sliding window. A tumbling window may be specified by an eviction policy. When the eviction policy for a tumbling window is met, the stream operator may execute operator logic on the tuples currently in the window and then empties the window. With respect to a tumbling window, the "conclusion" of a windowing condition, in this description and the claims, may refer to when the eviction policy for a tumbling window is met. The eviction policy of a tumbling window may be based on a count of tuples, a time interval, a delta, or punctuation. A delta is a difference between an attribute of an oldest tuple and a newest tuple. For example, a windowing condition may compare timestamps. Processing and eviction may be triggered when a time difference exceeds a specified value. A punctuation is a control signal that appears interleaved with the tuples in a stream. Punctuation appears in the data flow and may, for example, notify a stream operator of the grouping of tuples to be processed.

In contrast to a tumbling window, a sliding window does not automatically flush the window when the window is full. Once a window is full, a sliding window expels the oldest tuple when a new tuple arrives to replace it. In this way, a sliding window maintains the size of the window. A sliding window may be specified by an eviction policy and a trigger policy. The eviction policy of a sliding window may be based on a count of tuples, a time interval, or an attribute delta. The trigger policy specifies when the stream operator executes operator logic on the tuples currently in the window. The trigger policy may be based on a count of tuples, a time interval, or an attribute delta. The eviction and trigger policies are independent of one another. With respect to a sliding window, the "conclusion" of a windowing condition, as used in this description and the claims, may refer to when the trigger condition of a sliding window is met.

The phrase "windowing conditions," as used in this description and the claims, may include the conditions used to describe eviction and trigger policies. A stream operator that includes a windowing condition may be referred to, in this description and the claims, as a windowing operator. Windowing may be specified in any number of ways. For example, an application programmer may define one or more specific windowing conditions. Additionally, the system may provide a set of windowing conditions.

As used herein, an "intermediate result" is information conveyed by a group of tuples that may be sent by a stream operator that has performed its operations on accumulated tuples before the trigger policy (for a sliding window) or the eviction policy (for a tumbling window) has been triggered. For example, if a stream operator has a 30-tuple tumbling window, and sends out a group of tuples when it has only accumulated 15 tuples of data, the group of tuples will contain an intermediate result. An operator may be configured to routinely transmit intermediate results according to an "intermediate window." An intermediate window may establish how many tuples, or for how long, a stream operator should accumulate tuples before sending out an intermediate result. As is the case with the standard windows discussed above, an intermediate window may be, e.g., time-based or tuple-based, and sliding or tumbling.

Unlike with standard windows, an intermediate window may only have a trigger policy and not an eviction policy. Therefore, the conclusion of an intermediate window may not include evicting any tuples from memory. For example, at the conclusion of a 2 minute standard tumbling window, a stream operator may perform an operation on received tuples, transmit the results downstream, and clear the received tuples from memory. Alternatively, with a 2 minute intermediate tumbling window, at the conclusion of a window, the stream operator may perform an operation on the received tuples, transmit results downstream, but may not evict any tuples from memory.

Because intermediate windows do not necessarily have an eviction policy, adding an intermediate window to a stream operator that also has a standard window may not affect the results sent at the conclusion of the standard window. For example, assume a stream operator is configured to accumulate 100 tuples and send the sum of the tuples downstream. Also assume that an intermediate window of 75 tuples is added to the stream operator. After aggregating 75 tuples, the stream operator will sum the tuples and send the intermediate results downstream in accordance with its intermediate window, but it will not evict the processed tuples from its memory. After 25 more tuples are received, the stream operator will sum the 100 tuples and send the intermediate results downstream in accordance with its standard window. Because the intermediate window did not have an eviction policy, the same 100 tuples were summed in accordance with the stream operator's standard window as would have been if there had been no intermediate window, and the results are unchanged by the inclusion of an intermediate window.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
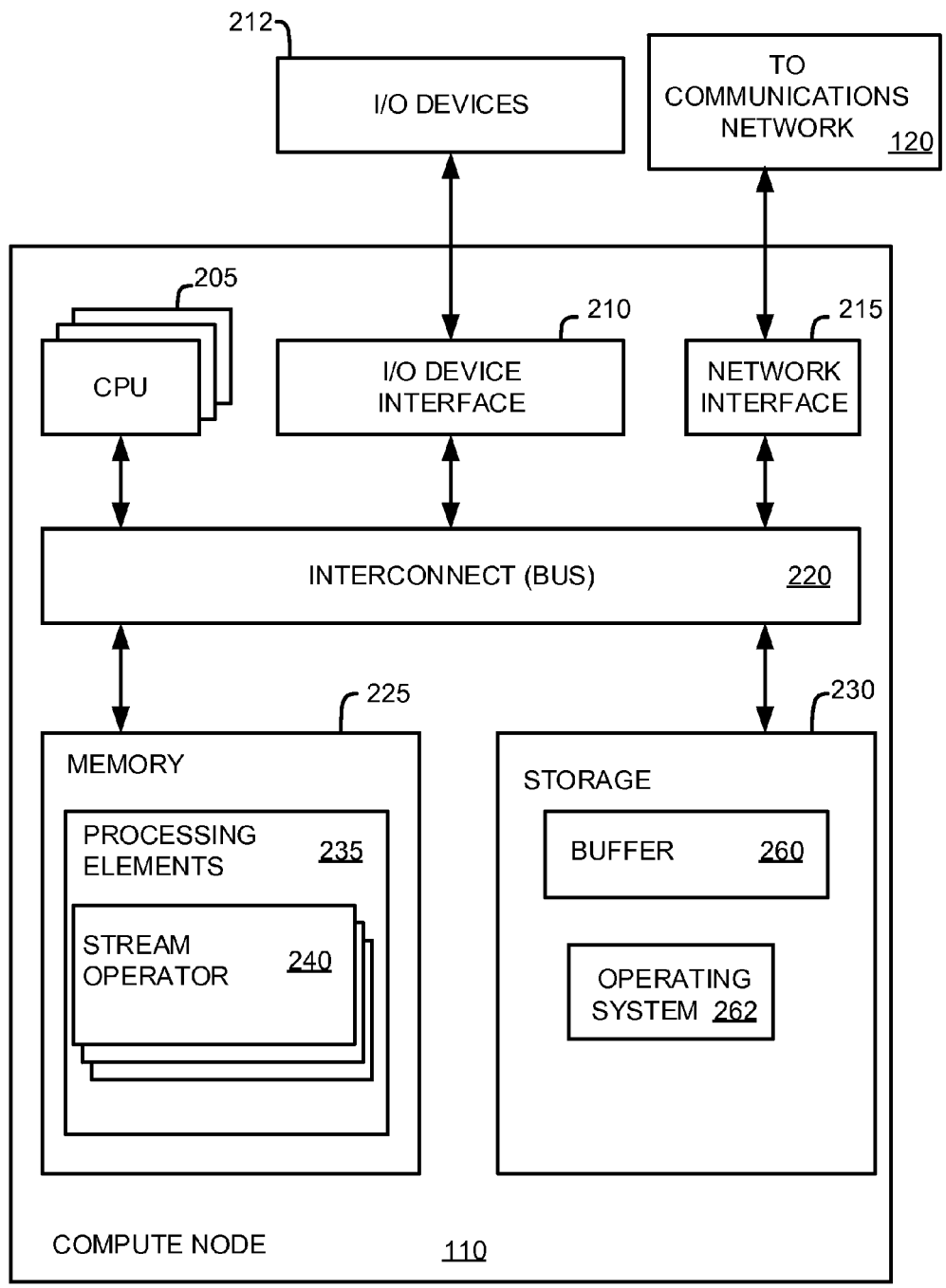
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
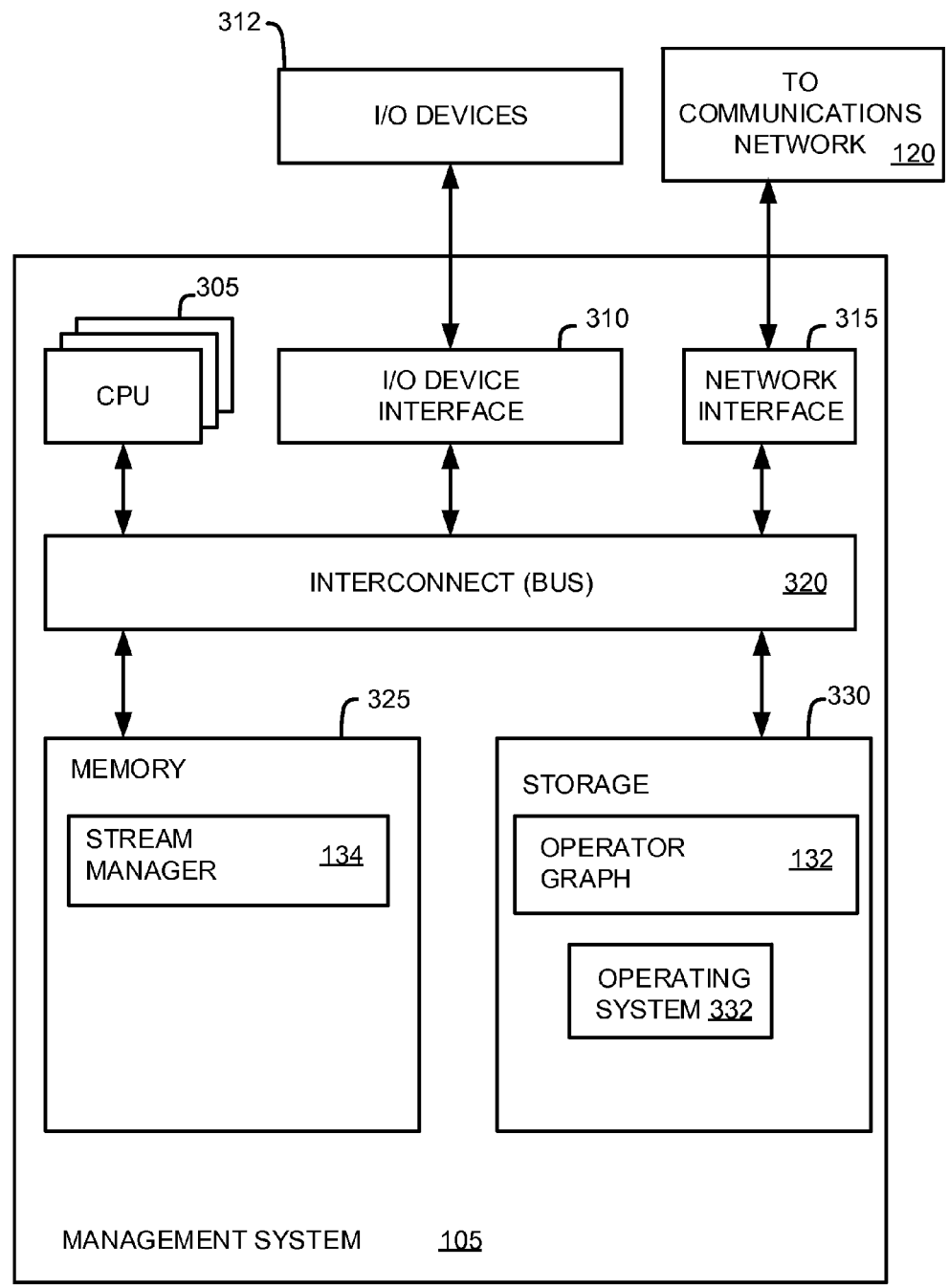
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
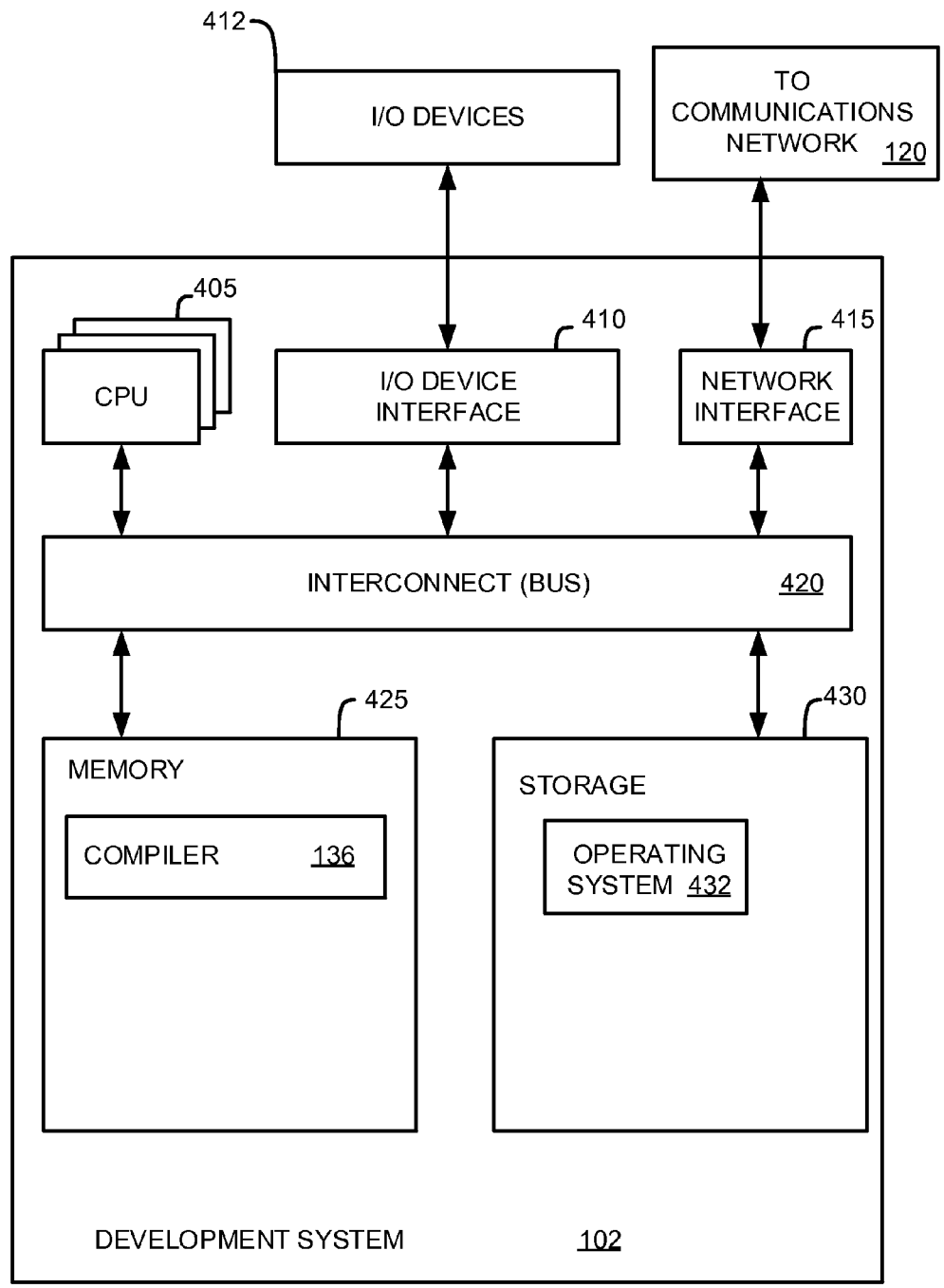
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and a storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
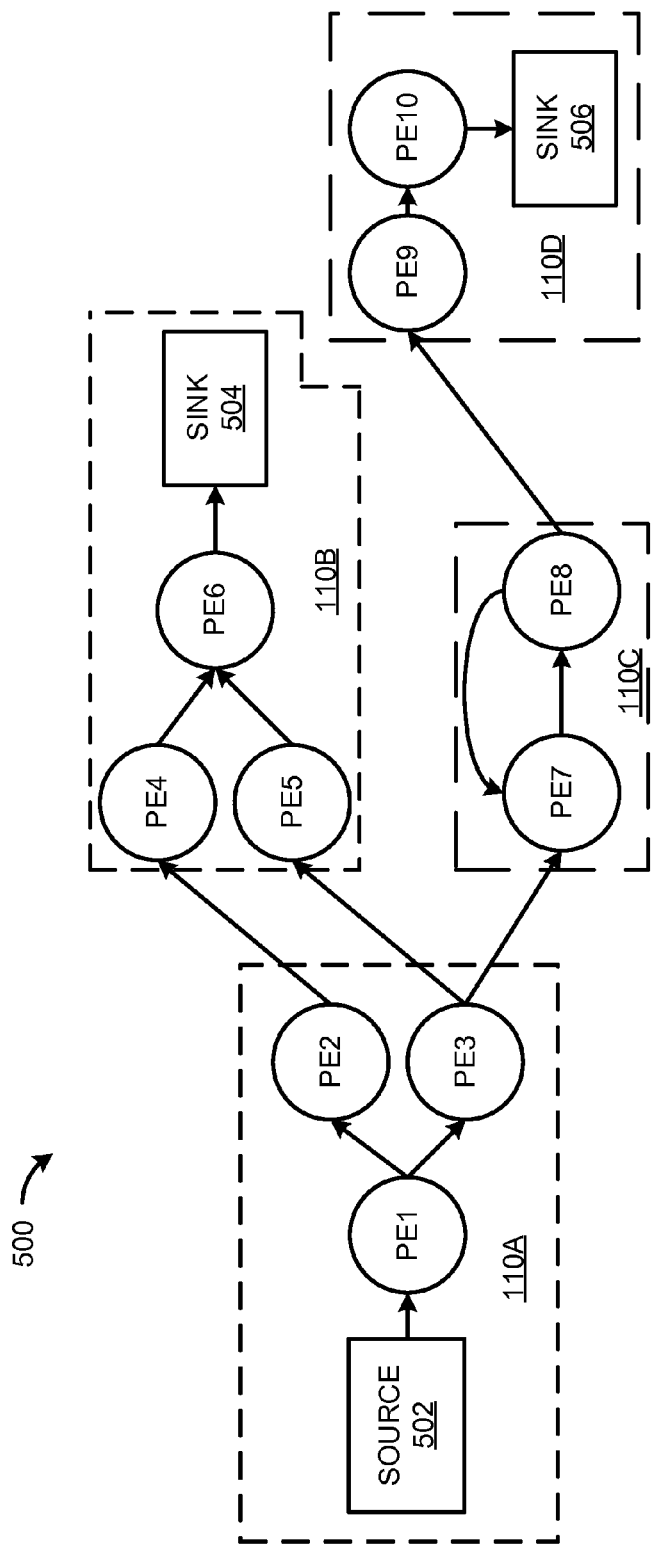
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figures 6A, 6B:
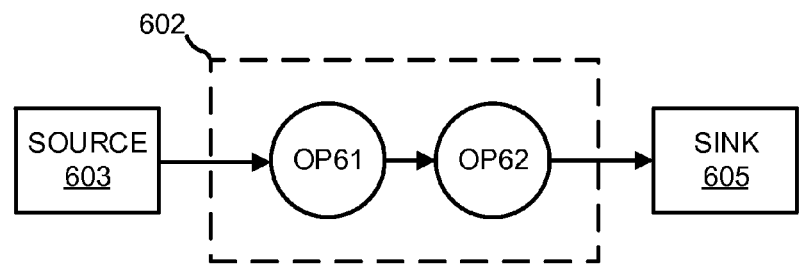
FIG. 6A illustrates an example of an operator graph of a stream computing application in which illustrative embodiments of the present disclosure may be implemented.
FIG. 6B illustrates an example table depicting tuple data that may be accumulated by an operator, in accordance with embodiments of the present disclosure.

FIGS. 6A and 6B illustrate an example of a stream computing application in which illustrative embodiments of the present disclosure may be implemented. The stream computing application of FIGS. 6A and 6B is a simple application used for illustrative purposes. Embodiments of the present disclosure may be implemented on stream computing applications with more complexity than shown in FIGS. 6A and 6B. In this example, the results of an election may be tracked in real time.

Referring now specifically to FIG. 6A, shown is an example of an operator graph of a stream computing application with a first job 602, a source 603, and a sink 605. The first job 602 may comprise two stream operators OP61-62. The first stream operator OP61 may import vote counts corresponding to a plurality of polling places from one or more sources 603. The first stream operator OP61 may accumulate the data it receives from the source 603 according to its window. When the eviction policy is triggered, the first stream operator OP61 may compute the sum of the number of votes for each of the candidates and transmit the sums in one or more tuples to the second stream operator OP62. The second stream operator OP62 may process the results so that they are in a form that can be used by non-stream computing applications, and transmit them to the sink 605.

Referring now to FIG. 6B, shown is an example table 610 of tuple data accumulated by the first stream operator OP61 of FIG. 6A, in accordance with embodiments of the present disclosure. The table 610 is a visual representation of accumulated tuples used for an illustrative purpose. It does not necessarily show the exact mechanism or process by which a stream operator may accumulate and store tuples or data. The table 610 may consist of three columns 612A-C and ten rows 614A-J. Each row may correspond to a different tuple received by the first stream operator OP61 from one or more source 603. Each column may store the attributes of the received tuples. For example, the first column 612A may store a tuple ID. The tuple ID may be a number that identifies which polling place sent the data. The second column 612B may store the number of votes that a first candidate received at each polling place. The third column 612C may store the number of votes that a second candidate received at each polling place.

For example, the first tuple received during the windowing period by the first stream operator OP61 may be seen in the first row 614A. The tuple may have the tuple ID of '1,' shown in the first column 612A, indicating that the tuple was sent by a first polling place. As seen in the second column 612B, the first candidate may have received four votes at the first polling place, and, as seen in the third column 612C, the second candidate may have received eight votes at the first polling place. The first stream operator OP61 may accumulate tuples in this fashion until its eviction policy is triggered. In the example shown in FIG. 6B, the first stream operator OP61 has accumulated ten tuples of data corresponding to ten polling places.

Figure 7:
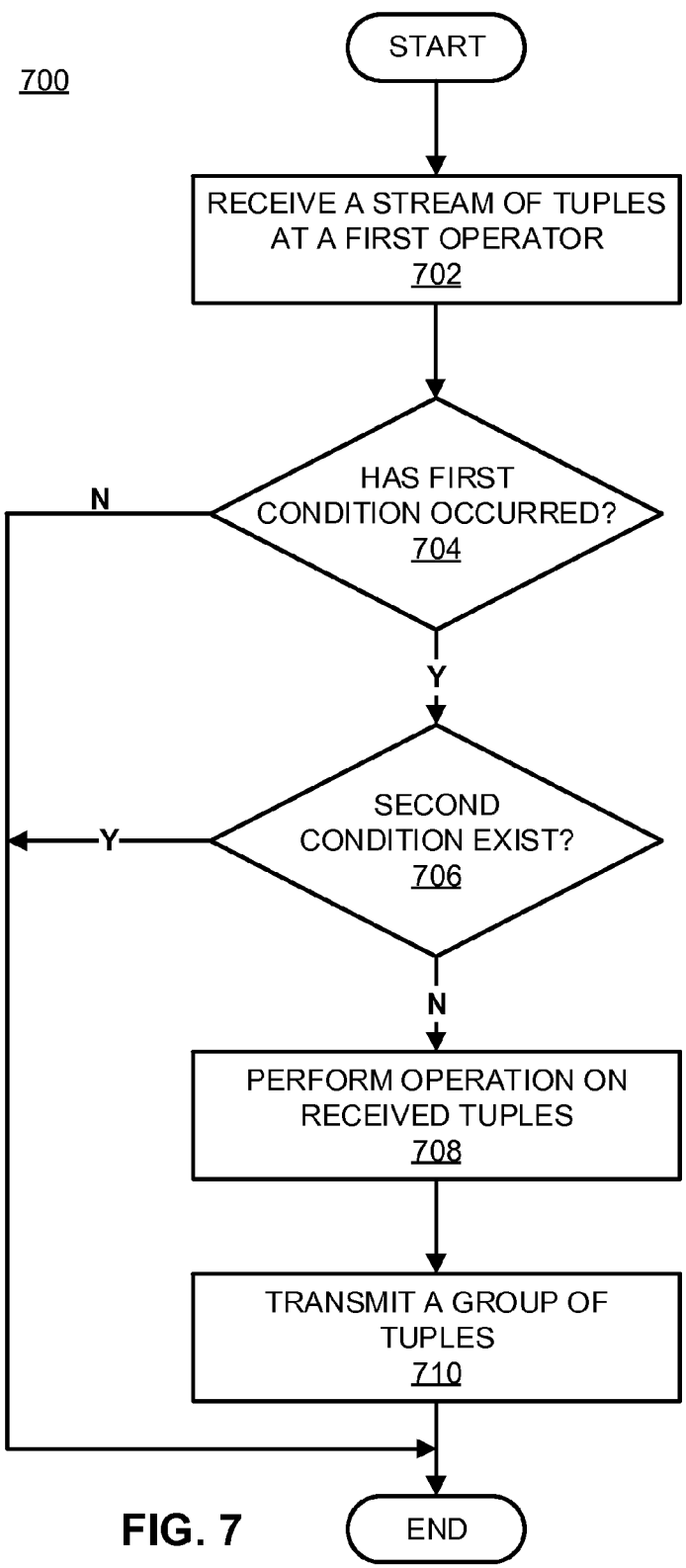
FIG. 7 is a flowchart illustrating a method for transmitting intermediate results, in accordance with embodiments of the present disclosure.

Referring now to FIG. 7, shown is a flowchart illustrating a method 700 for transmitting intermediate tuples, in accordance with embodiments of the present disclosure. In some embodiments, the method 700 may be performed by one or more stream operators. In other embodiments, the method 700 may be performed by a combination of one or more stream operators and a stream manager 134 (shown in FIG. 1). The method 700 may begin at operation 702, where a stream of tuples is received at a first stream operator.

The first stream operator may accumulate the stream of tuples according to its window. When the first stream operator's eviction policy is triggered, it may perform an operation on the received tuples and output one or more tuples to a second stream operator. The first stream operator may have any window supported by the stream computing application. For example, in some embodiments the first stream operator may have a tumbling window, while in other embodiments the first stream operator may use sliding windows. In either case, the window may be time-based or tuple-based.

At decision block 704, the first stream operator may determine whether a first condition has occurred. A first condition is a condition that, when it occurs, indicates that intermediate results are requested and that the first stream operator should transmit a group of tuples containing the intermediate results to the second stream operator. There are a number of ways that the first stream operator may determine that a first condition has occurred and that it should send intermediate results.

In some embodiments, the first stream operator may determine that a first condition has occurred when the first stream operator has accumulated enough data to perform its operations and, as a result, may send intermediate results before its eviction policy has been triggered. For example, the first stream operator may be configured to accumulate tuples according to a time-based tumbling window and, when the eviction policy triggers, calculate the average from the accumulated tuples. The first stream operator may determine that, even though it is only one half of the way through its window, a first condition has occurred because the first stream operator has accumulated enough data to perform its operations.

The first stream operator may determine that it has accumulated enough tuples by comparing the number of accumulated tuples to a threshold. The threshold may be configured by a user, or it may be based on historical information about the stream operator. For example, if the first stream operator has a 5 minute window, during which time it usually accumulates 50 tuples, the first stream operator (or the stream manager) may set a threshold of 100 tuples. If the first stream operator receives 100 tuples before the eviction policy triggers, it may calculate the average of the 100 tuples and transmit the intermediate results downstream. The first stream operator may then continue to accumulate tuples and, when the eviction policy triggers, perform an operation on the accumulated tuples (e.g., the original 100 tuples plus however many more have been received since the intermediate results were sent) and transmit the normal results downstream.

In some embodiments, the first stream operator may determine that a first condition has occurred when its memory becomes full. For example, the first stream operator may have a time-based tumbling window of, e.g., 10 minutes. The first stream operator determine that its memory is full and it is unable to accumulate any more tuples after only 5 minutes of aggregating tuples. In lieu of dropping the tuples it receives for the next 5 minutes until its eviction policy is triggered, or replacing windowed tuples already in memory with newer tuples, the first stream operator may determine that a first condition has occurred (memory has filled) and may perform an operation on the received tuples and transmit the intermediate results downstream. The first stream operator may then, in some embodiments, flush the window. In some embodiments, the first stream operator may not reset the window and may, instead, continue to receive new tuples and, for every new tuple received, evict the oldest tuple from its memory. In some embodiments, the first stream operator may drop the newly received tuples.

In some embodiments, the first condition may be that the second stream operator has directly requested the intermediate results. For example, in some embodiments, the second stream operator may join information from the first stream operator and a third stream operator. If the third stream operator has transmitted tuples to the second stream operator that indicates that an event may be happening, it may be important that the second stream operator respond in real-time. This may necessitate receiving information from the first stream operator immediately. If the first stream operator uses time-based windows, the second stream operator may wait until the first stream operator's eviction policy is triggered at the end of its window, react without updated information, or request intermediate results.

For example, in a pool-type nuclear reactor, a core of radioactive material is immersed in an open pool of water that acts, in part, to cool the core. If the core's temperature increases too much, the warmer pool water may be partially replaced by cool water. A first stream operator may monitor the temperature of the cooling water. Every 30 seconds, the first stream operator may take a temperature reading and, every 5 minutes, it may average the 10 readings and transmits the average to a second stream operator. A third stream operator may monitor the temperature of the core and transmit the temperature to the second stream operator. The second stream operator may, based on the information it receives from the first and third stream operators, determine whether to replace some of the pool water with the cooling water. Making that determination may require up-to-date information regarding the temperature of the cooling water and of the core. If the third stream operator sends information to the second stream operator that indicates that the core is getting too hot, the second stream operator may determine that cooling water needs to be added to the pool immediately. If the first stream operator's eviction policy will not trigger for another three minutes, the second stream operator may send a request for intermediate results so that it can accurately determine how much cool water to add to the pool.

In some embodiments, it may be determined that a first condition has occurred when the second stream operator needs the first stream operator to send intermediate results in order for the second stream operator to perform its operations. For example, assume that a first tuple from a data stream is sent to two stream operators so that two operations may be performed on that tuple in parallel. A first stream operator may perform a first operation on the first tuple and output a second tuple, and a second stream operator may perform a second operation on the first tuple and output a third tuple. In some circumstances, it may be beneficial to join the second and third tuples together. A third stream operator may be used to synchronize tuples from two or more streams. The third stream operator may work even if the first and second operators perform their operations, and therefore output tuples, at different rates by holding on to a tuple received at one port until a corresponding tuple is received at a second port. The third stream operator may be used to rejoin the tuples and output a single tuple of data that incorporates the operations performed by the first and second stream operators.

If the first and second stream operators have different windowing conditions, the third stream operator may receive several tuples from the first stream operator before receiving one from the second stream operator. Because the third stream operators holds on to tuples until it receives a corresponding tuple from another data stream, the third stream operator's memory may begin to fill up. For example, if the first stream operator outputs a tuple every 1 minute, and the second stream operator outputs a tuple every 5 minutes, the third stream operator will, at the end of 5 minutes, have 4 extra tuples stored in memory waiting to be matched with a corresponding tuple. After 10 minutes, the third stream operator will have 8 tuples saved in memory, and so on. Instead of keeping data in memory, allowing it to grow older while waiting to be processed, it may be determined that the third stream operator needs intermediate results from the second stream operator in order to timely process its data and to keep its memory from filling. Accordingly, the second stream operator may send intermediate results to the third stream operator whenever the first stream operator sends its results.

In some embodiments, it may be determined that a first condition has occurred when the results being output by the first stream operator are changing. A first condition may be considered present if the result output by the first stream operator deviates from an average by more than a threshold, or if the results lies outside of a confidence interval determined from the historical results sent by the first stream operator.

For example, the first stream operator may be configured to accumulate tuples for 10 minutes before calculating an average from the tuples. Considering the pool-type nuclear reactor discussed herein, the average may correspond to, e.g., the temperature of the core. For a few hours, the average of the accumulated tuples may be calculated to be around 150 degrees Celsius, with little deviation. The stream computing application for the nuclear reactor may be configured so that a first condition has occurred if a result deviates from the norm by more than a threshold (e.g., a threshold of 50 degrees Celsius). If the second stream operator receives a tuple from the third stream operator that suggests that the temperature averaged 215 degrees Celsius for the last 10 minutes, thereby surpassing the threshold, the first stream operator may send intermediate results every 30 seconds so that the second stream operator can determine whether the core's temperature is steadily rising, which may be dangerous, or if the result was an outlier or inaccurately measured.

As another example, it may be determined that a first condition has occurred if a result sent by a stream operator is outside of a confidence interval. For example, again looking at the pool-type nuclear reactor, the core's temperature readings may consistently lie between 134 degrees Celsius and 158 degrees Celsius, with a mean of 150 degrees Celsius. Based on this historical data, a confidence interval may be created that determines a normal operating range of temperatures for the core to be between 130 degrees Celsius and 160 degrees Celsius. If the second stream operator receives a temperature reading from the third stream operator that lies outside of this range, the third stream operator may begin to send intermediate results every 30 seconds in addition to the normal results that it sends every 10 minutes.

After determining that a first condition has occurred per decision block 704, the first stream operator may determine whether a second condition exists at decision block 706. In some embodiments, the presence of a second condition may indicate that, regardless of whether a first condition has occurred, the first stream operator should not send intermediate results. In some embodiments, a second condition may indicate that the first stream operator is unable to perform its operations on the received tuples. This may be, for example, because the first stream operator lacks available system resources to perform its operations. It may also be because the first stream operator has not received enough tuples to perform its operations. In some embodiments, a second condition may indicate that the second stream operator is unable to receive intermediate tuples. In some embodiments, the stream manager, instead of the first stream operator, may determine whether a second condition exists. In other embodiments, a different stream operator (e.g., the second stream operator) or processing element may determine that a second condition exists.

For example, the first stream operator may monitor available system resources when determining whether a second condition exists. The available system resources may include, e.g., available memory and CPU utilization. The available system resources may correspond to the first stream operator, the second stream operator, or any other stream operators in the operator graph. For example, if the second stream operator does not have available memory to store additional data, the first stream operator may determine that the second stream operator is not capable of receiving and/or processing the intermediate results at that time. As another example, if the CPU utilization of the first stream operator is very high, the first stream operator may determine that it is not capable of performing any operations on the tuples that it has already received and, therefore, may not transmit intermediate results.

In some embodiments, determining whether a second condition exists includes the first stream operator determining whether it has enough data to perform its operations at decision block 706. For example, a first stream operator may be configured to receive a plurality of tuples, each tuple having a first attribute with a number in it, and to calculate the mean and standard deviation of those tuples. If, when the intermediate results are requested, the first stream operator does not have any accumulated tuples, it will be unable to calculate the mean and standard deviation. Therefore, the first stream operator may determine that a second condition exists and that it cannot send intermediate results, even if a first condition has occurred.

In some embodiments, the first stream operator may be configured to determine whether the intermediate results will be meaningful according to a predetermined set of criteria. If the results will not be meaningful, the first stream operator may determine that a second condition exists and it will not transmit intermediate results, even if they are requested by the second stream operator. For example, again take the case of an operator configured to find the mean and standard deviation of a set of data. If the intermediate results are requested when the operator has two tuples of data accumulated, it may be possible to calculate the mean and standard deviation. However, the mean and standard deviation of a set of two numbers may be, in some circumstances, low value information because the mean and standard deviation calculation would be highly susceptible to outliers. Accordingly, the first stream operator may, in some embodiments, determine that the intermediate results are not meaningful and should not be sent even if they are requested.

In some embodiments, determining how many tuples are needed before data is considered meaningful and intermediate results should be sent can be configured by a user or established by an administrator of the stream computing application using, e.g., known statistical analysis techniques. The administrator may establish a threshold number of tuples. The threshold may establish the minimum acceptable number of accumulated tuples for a stream operator to output intermediate results. If the stream operator has accumulated a greater number of tuples than the threshold, it may be able to send intermediate results. Otherwise, a second condition may exist and the stream operator may not be able to output intermediate results. For example, the administrator may determine that there must be at least 20 tuples of data accumulated by an operator that calculates the mean or standard deviation for the results to be considered meaningful. Accordingly, if a stream operator is configured to calculate the standard deviation of received tuple, and it has accumulated 15 tuples when a request for intermediate results is made, the stream operator may determine that a second condition exists and that it may not transmit the intermediate results.

If, at decision block 706, the first stream operator determines that a second condition exists and that it should not transmit intermediate results, the method 700 may end. If, however, the first stream operator determines that a second condition is not present and that it should send intermediate results, the first stream operator may perform one or more operations on the tuples that it has received per operation 708. At operation 710, the first stream operator may transmit a group of one or more tuples with the intermediate results to the second stream operator, and the method 700 may end. In some embodiments, the first stream operator's windows will not be reset after the intermediate results are transmitted. In other embodiments, the first stream operator's window may be reset when the intermediate results are sent.

In some embodiments, the first stream operator may determine that intermediate results should be periodically sent according to an intermediate window. In some embodiments, the intermediate window may be dynamically reconfigured. For example, if a second stream operator repeatedly requests intermediate results every 2 minutes, and the first stream operator's windowing conditions establish a 5 minute window, the stream manager may create an intermediate window for the first stream operator. The intermediate window may, in this case, cause the first stream operator to transmit intermediate results every 2 minutes. Unlike the first stream operator's standard window, in some embodiments, the intermediate window may not include an eviction policy that clears the first stream operator's memory.

In some embodiments, the stream manager may determine that the intermediate window should replace the standard window, in which case the intermediate window may be modified to include an eviction policy. This may be done if, e.g., the stream manager determines that the intermediate window is providing information that is sufficiently accurate so that there is a low probability of the downstream operators receiving bad information (e.g., information that causes their results to be different from what is expected or correct). For example, a stream operator may be configured to calculate the average of a group of received tuples. If the intermediate results sent in accordance with the intermediate window are consistently close to (e.g., within a threshold of) the results sent in accordance with the standard window, the stream manager may determine that the intermediate window is providing meaningful results, and the intermediate window may replace the standard window.

In some embodiments, the intermediate results may be tuple-based even if the window is time-based. For example, a first stream operator may have a window that accumulates tuples for 5 minutes before performing an operation on the tuples and transmitting results to a second stream operator. The second stream operator may request intermediate results be sent for every 20 tuples received by the first stream operator. The stream manager may then create an intermediate window for the first stream operator that causes the first stream operator to send intermediate results every 20 tuples, even though the standard window is time-based. In other embodiments, the reverse may be true; the stream manager may create an intermediate window for the first stream operator that is time-based, even if the standard window is tuple-based.

In some embodiments, the group of tuples sent as intermediate results may contain additional attributes not normally sent. These additional attributes may include, e.g., a number corresponding to the percentage of window completion at the time of transmittal. For example, if a first stream operator has a window that instructs aggregating 30 tuples, and intermediate results are requested and sent when only 15 tuples have been received by the first stream operator during the existence of the window, the group of tuples sent by the first stream operator may include an attribute that informs the second stream operator that 50% of the window was complete when the intermediate results were sent. The additional attributes may also include a confidence level in the accuracy or usability of the intermediate results, as well as the total number of tuples accumulated by the first stream operator when the intermediate results were transmitted.

Applying the method 700 to the example discussed in reference to FIGS. 6A and 6B, a first stream operator OP61 may be configured using a tuple-based window to accumulate voting data from a source. The window may cause the first stream operator OP61 to accumulate the voting data until it has 30 tuples of data stored in its memory, one for each polling place within the precinct where the election is taking place. Once all the polling places in the precinct have reported their results, the first stream operator OP61 may sum the votes received by each candidate and send the results to the second stream operator OP62, where the results are formatted such that a user (e.g., a local newspaper) can import the results into, e.g., their website. The properly formatted results may be sent to the sink 605 and provided to the user.

The user may decide that it wants to host a discussion page on its website, where the user's customers may talk about the elections going on, including the local election that is being monitored by the streams computing application. The user may believe that the discussion page will be better served if, instead of waiting until all polling places have reported before providing a vote count to their customers, customers could get updates as they are known. The user may request intermediate results from the first stream operator be sent out so that the user can update his website with up-to-date information. As discussed herein, the intermediate results may be sent using a tuple-based intermediate window (e.g., every time a polling place submits its vote count), a time based intermediate window (e.g., every 5 minutes), or any other type of window that the stream computing application can utilize.

The first stream operator OP61 may, in response to the request, and after determining that no second condition exists, calculate the sum for each candidate and transmit a group of tuples to the second stream operator OP62. The group of tuples may include additional attributes, such as the percentage of polling places that have reported their votes or a list of which polling places have reported their votes. The second stream operator OP62 may then convert the tuples it receives into a format more useful to the user, such as java or html, and send it to the user through the sink 605, and the process may end.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for processing a stream of tuples, the method comprising:
    receiving a stream of tuples to be processed by a plurality of processing elements operating on one or more computer processors, each processing element having one or more stream operators;
    receiving the stream of tuples at a first stream operator, the first stream operator being configured to accumulate the stream of tuples according to a first set of windowing conditions, the first set of windowing conditions being internal to the first stream operator, the first set of windowing conditions including an operation to be performed on received tuples and an eviction policy, wherein the first stream operator is further configured to output a first group of tuples to a second stream operator when the eviction policy triggers;
    determining that an intermediate group of tuples are requested before the eviction policy triggers;
    performing, in response to determining that an intermediate group of tuples are requested, by the first stream operator, the operation on the received tuples before the eviction policy triggers; and
    transmitting, by the first stream operator, a second group of tuples to the second stream operator before the eviction policy triggers.

2. The method of claim 1, wherein the second group of tuples includes additional attributes.

3. The method of claim 1, the method further comprising:
    creating an intermediate window for the first stream operator, the intermediate window being defined by a second set of windowing conditions;
    performing, in response to the first stream operator having an intermediate window, by the first stream operator, the operation on the received tuples according to the intermediate window; and
    transmitting, by the first stream operator, a third group of tuples to the second stream operator.

4. The method of claim 1, wherein the determining that an intermediate group of tuples are requested comprises:
    determining that a first condition has occurred, the first condition indicating that an intermediate group of tuples are requested before the eviction policy triggers, the intermediate group of tuples conveying intermediate results.

5. The method of claim 4, wherein the determining that a first condition has occurred comprises determining that the second stream operator sent a request for the intermediate group of tuples to the first stream operator.

6. The method of claim 4, wherein the determining that a first condition has occurred comprises determining that a first memory space for the first stream operator is full.

7. The method of claim 4, wherein the determining that a first condition has occurred comprises determining that the first stream operator has accumulated a number of tuples, the number of tuples exceeding a threshold.

8. The method of claim 4, wherein the determining that a first condition has occurred comprises determining that the second stream operator requires the first stream operator to send the intermediate group of tuples in order for the second stream operator to perform its operations.

9. The method of claim 4, wherein the determining that a first condition has occurred comprises:
    determining a first set of results at a first time by monitoring the second group of tuples received by the second stream operator over a period of time, the period of time ending at the first time;
    determining an average of the first set of results;
    determining a first result at a second time by monitoring the second group of tuples received by the second stream operator at the second time, the second time being subsequent to the first time; and
    determining that the first condition has occurred by determining that the first result deviates from the average of the first set of results by more than a threshold.

10. The method of claim 4, wherein the determining that a first condition has occurred comprises:
    determining a first set of results at a first time by monitoring the second group of tuples received by the second stream operator over a period of time, the period of time ending at the first time;
    determining a confidence interval for the first set of results;
    determining a first result at a second time by monitoring the second group of tuples received by the second stream operator at the second time, the second time being subsequent to the first time; and
    determining that the first condition has occurred by determining that the first result lies outside of the confidence interval for the first set of results.

11. The method of claim 4, wherein the determining that an intermediate group of tuples are requested further comprises:
    determining, in response to determining that the first condition has occurred, that a second condition is not present, the second condition indicating that the first stream operator should not output the intermediate group of tuples before the eviction policy triggers.

12. The method of claim 11, wherein the determining that a second condition is not present comprises determining that the first stream operator has sufficient available system resources to transmit the intermediate group of tuples.

13. The method of claim 11, wherein the determining that a second condition is not present comprises determining that the second stream operator has sufficient available system resources to receive the intermediate group of tuples.

14. The method of claim 11, wherein the determining that a second condition is not present comprises determining that the first stream operator has accumulated enough tuples to perform the operation.

15. The method of claim 11, wherein the determining that a second condition is not present comprises determining that a number of tuples accumulated by the first stream operator is greater than a threshold, the threshold establishing a minimum number of tuples necessary for the first stream operator to produce meaningful results.

* * * * *